(12) United States Patent
Olston et al.

(10) Patent No.: US 7,805,447 B2
(45) Date of Patent: Sep. 28, 2010

(54) GENERATING EXAMPLE DATA FOR TESTING DATABASE QUERIES

(75) Inventors: Christopher Olston, Mountain View, CA (US); Utkarsh Srivastava, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 357 days.

(21) Appl. No.: 12/015,392

(22) Filed: Jan. 16, 2008

(65) Prior Publication Data

US 2009/0182706 A1 Jul. 16, 2009

(51) Int. Cl.
*G06F 17/30* (2006.01)
(52) U.S. Cl. .................... 707/737; 707/692
(58) Field of Classification Search ............. 707/692, 707/706, 708, 717, 736, 794, 737, 739
See application file for complete search history.

(56) References Cited

U.S. PATENT DOCUMENTS

| | | | | |
|---|---|---|---|---|
| 6,542,886 | B1 * | 4/2003 | Chaudhuri et al. | 1/1 |
| 6,691,099 | B1 * | 2/2004 | Mozes | 1/1 |
| 7,567,949 | B2 * | 7/2009 | Chaudhuri et al. | 1/1 |
| 2004/0059743 | A1 * | 3/2004 | Burger | 707/101 |
| 2004/0249810 | A1 * | 12/2004 | Das et al. | 707/5 |
| 2006/0116984 | A1 * | 6/2006 | Zurek | 707/3 |

OTHER PUBLICATIONS

Chaudhuri et al, "Dynami Sample Selection for Approximate Query Processing", Jun. 2003, ACM, pp. 539-550.*
Chaudhuri et al, "A robust, Optimization Based Approach for Approximate Answering of Aggregate Queries", May 2001, Santa Barbara, California, p. 295-306.*
Chaudhuri et al, "Overcoming Limitations of Sampling for Aggregation Queries", 9 pages.*

* cited by examiner

*Primary Examiner*—Cam-Linh Nguyen
(74) *Attorney, Agent, or Firm*—Stattler-Suh PC (57) ABSTRACT

Computer-implemented methods, modules and clients relate to expanded, pruned sample table for testing database queries against a base table. The expanded, pruned sample table is formed from the base table by a process of initial sampling, synthesis, and pruning.

14 Claims, 5 Drawing Sheets

Menu

Query

```
pages =
    LOAD 'pages' AS (url, pagerank);

visits =
    LOAD 'user_log' AS (user_id, url);

page_visits =
    COGROUP pages BY url,
            visits BY url;

frequent_visits =
    FILTER page_visits
    BY COUNT(visits) >= 2;

answer =
    FOREACH frequent_visits
    GENERATE FLATTEN(pages.pagerank);
```

Submit

Example Data pages:      <cnn.com, 0.9>
            <snails.com, 0.3> visits:     <al, cnn.com>
            <sue, cnn.com>
            <bill, snails.com> page_visits:
            <cnn.com,
              {<cnn.com, 0.9>},
              {<al, cnn.com>,<sue, cnn.com>}>
            <snails.com,
              {<snails.com, 0.3>},
              {<bill, snails.com>}> frequent_visits:
            <cnn.com,
              {<cnn.com, 0.9>},
              {<al, cnn.com>,<sue, cnn.com>}> answer: <0.9>

GENERATING EXAMPLE DATA FOR TESTING DATABASE QUERIES

BACKGROUND OF THE INVENTION

1. Field of the Invention

The present invention relates to databases, particularly to techniques for aiding in database query composition.

2. Art Background

The process of constructing a database query is typically an iterative one: A user makes an initial stab at composing a query, submits it to the database system for execution, and inspects the output to determine whether the query had the intended effect. If not, the user revises the query and repeats this process. If queries take a long time to execute (e.g. because the database is large), this process can be very slow.

To avoid this slowness, users sometimes create a side database consisting of a small sample of the original one, for experimentation. Unfortunately, this method does not always work well. For example, suppose the query performs a join of two tables A(x,y) and B(x,z) with the join predicate specifying equality of the two x attributes. If the original data contains many distinct values for x, then it is unlikely that a small sample of A and a small sample of B contain any matching x values. Hence the join query over the sample database may well produce an empty result, even if the query is correct. Similarly, a query with a selective filter executed on a data sample may produce an empty result. In general it can be difficult to test the semantics of a query over a sample database.

SUMMARY OF THE INVENTION

In one aspect, embodiments relate to computer-implemented methods for testing database query semantics. For example, some embodiments relate to a computer-implemented method of forming a sample table from a base table for testing semantics of a query to be run on the base table. The method comprises steps of sampling and synthesizing to form a final sample table. The base table is sampled to form an initial sample table. An intermediate table of each operator from an operator tree of the query is formed by passing the initial sample table through the operator tree. Then, an expanded sample table is synthesized from the base table based on incompleteness in the intermediate table and the expanded sample table is passed through the operator tree to form an expanded intermediate table.

In another example, a computer-implemented method of forming a sample table from a base table for testing semantics of a query to be run on the base table. The method comprises steps of sampling and pruning to form a final sample table. The base table is sampled to form an initial sample table. An intermediate table of each operator from an operator tree of the query is formed by passing the initial sample table through the operator tree. Then, the sample table is pruned to form a final sample table. Pruning proceeds by grouping equivalence classes of equivalent records in the intermediate table and retaining a set of sample table records whose corresponding set of intermediate records includes at least one record from all equivalent classes while being as small as possible.

In a further example, steps of sampling, synthesizing, and pruning are all included in a method consistent with some embodiments of the present invention.

Then, an expanded sample table is synthesized from the base table based on incompleteness in the intermediate table and the expanded sample table is passed through the operator tree to form an expanded intermediate table.

In another aspect, embodiments relate to database clients. For example some embodiments relate to a database query-testing client. The client comprises a query composition element and a semantic illustration element. Within the query composition element a user composes a query for use on a base table. The semantic illustration element that displays the effect of the query composed in the query composition element on a sample table formed from the base table. The sample table is formed via a process of initial sampling, synthesis, and pruning.

In still another aspect, embodiments relate to computer-implemented modules that interface with a database server and a database client. For example, a module that interfaces with servers and clients to form a sample database from a base table, comprising: an input element, a database-sampling element, and a processing element. The receiving element receives a query comprising a set of operators that form an operator tree. The database-sampling element samples the base table to form an initial sample table. The processing element forms an intermediate table by passing the initial sample table through the operator tree. Further, the processing element synthesizes an expanded sample table from the base table based on incompleteness in the intermediate table of each operator. In addition, the processing element prunes the expanded sample table to form a final sample table. Pruning proceeds by grouping equivalence classes of equivalent records in an expanded intermediate table, which is formed by passing the expanded sample table through the operator tree, and retaining a set of expanded sample table records whose corresponding set of intermediate records includes at least one record from all equivalent classes while being as small as possible.

DETAILED DESCRIPTION

This disclosure sets forth methods and systems related to constructing a set of example data for testing a query against a database. These techniques use the query itself to guide construction of the example data.

User Interface

Figure 1:
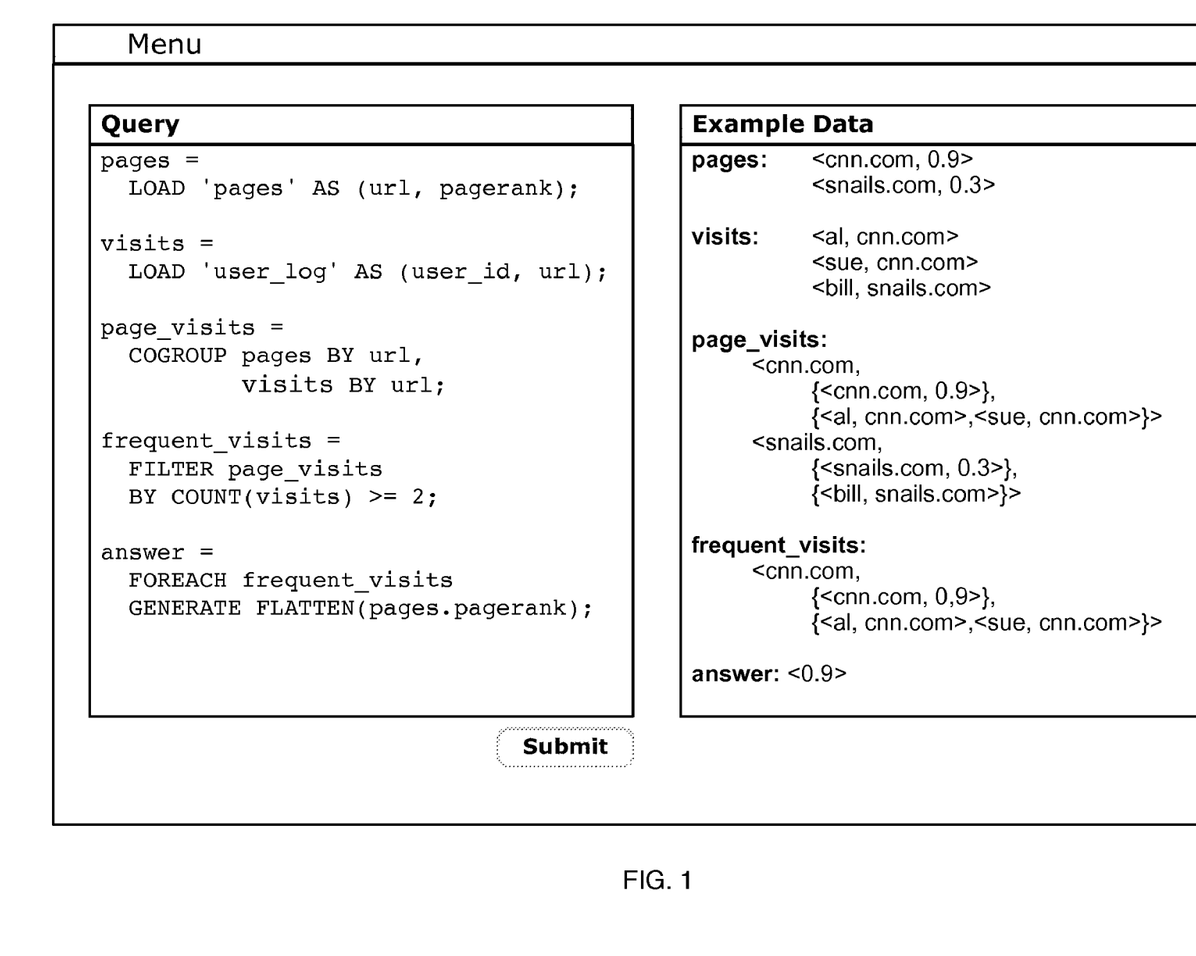
FIG. 1 illustrates a user interface of a query composition client consistent with some embodiments of the present invention.

FIG. 1 illustrates a user interface for composing queries consistent with some embodiments of the present invention. The UI illustrated includes a Menu bar, two panels and a Submit button.

The Query panel, on the left hand side, is an entry field into which a user types a sequence of query commands. The Example Data panel, on the right-hand side, is filled in automatically by the system, illustrating the semantics of the query sequence.

Preferably, as query commands are typed in the Query panel, the commands are sent to the system, which periodically updates the underlying sample tables and the Example Data panel. The specifics of the polling and refreshing implementation are flexible.

As illustrated, the Query panel contains a statement in the language of the database system with which the UI is used. A variety of languages are considered, for example Structured Query Language (SQL) or Pig Latin. In FIG. 1, the language used is Pig Latin.

The Pig Latin commands illustrated are each stated as equations, with the left-hand side of the equation a variable whose value is a database table, e.g. a set of database records. In the Query panel of FIG. 1 the variables are named pages, visits, page_visits, frequent_visits, and answer. The Example Data panel of the UI shows a sequence of example database tables, one corresponding to each query variable. In FIG. 1, angle brackets (<...>) denote the boundaries of a record, and curly braces ({...}) denote the boundaries of a set of records.

Consistent with embodiments of the present invention, the Example Data preferably exhibit the properties of Realness, Completeness, and Conciseness, as explained below. Realness refers to example tables that correspond to original database tables (e.g. pages and visits in FIG. 1) should be subsets of the actual database tables, if possible. If not, then to the extent possible the individual data values should be ones found in the actual database.

Completeness refers to the example tables fully illustrating the semantics of each query command. For example, the example tables for pages, visits, and page_visits collectively illustrate the semantics of the COGROUP command, which combines input records that have matching data values into a single record. As another example, the example tables for page_visits, frequent_visits illustrate the semantics of the FILTER command, which preserves records whose second field contains a set of cardinality two or more (e.g. the first record of page visits) and eliminates other records (e.g. the second record of page visits). Completeness is an operator-specific notion. Consistent with the embodiments of the present invention, its definition is informal and flexible, because it is difficult to formulate a generic definition that remains practical (e.g. leads to example data of finite size).

Conciseness refers to example tables that are as small as possible, while still illustrating the query semantics. For example, page_visits contains exactly one record that passes the FILTER command, and exactly one record that does not pass.

Generating Example Data

The query sequence in the Query panel operates over a (possibly very large) database, and example data must illustrate the semantics of the query sequence as realistically, completely and concisely as possible.

Figure 8:
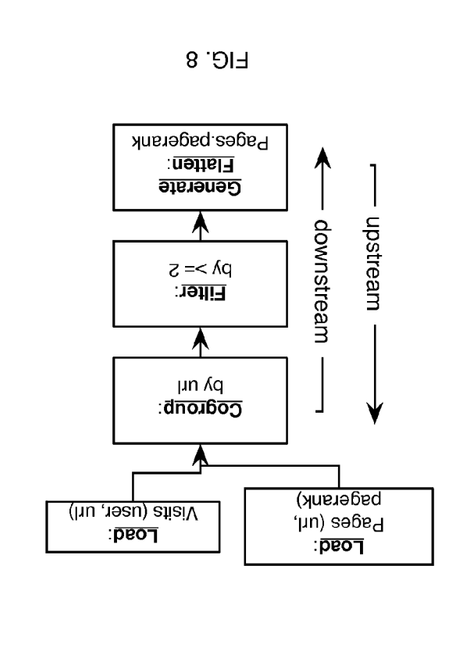
FIG. 8 is a query illustrated as an operator tree consistent with some embodiments of the present invention.

The query sequence is parsed and compiled into a tree of database operators, referred to as an operator tree, shown in FIG. 8. Data flows from leaves to root of the tree to produce the query answer.

Each leaf node contains a LOAD operator. A LOAD operator reads the content of a base table, which is a pre-existing table stored in the database. Non-leaf nodes contain operators that transform one table into another, such as FILTER, or ones that take multiple tables as input such as UNION. Exemplary Pig Latin operators include LOAD, which reads the content of a base table; FILTER, which eliminates unwanted records; PROJECT, which eliminates unwanted field; GROUP, which nests input records into output records such that each output record contains input records that match in some way; COGROUP, which performs grouping over multiple input tables; and UNION, which places each record from each input table into a single output table.

Each operator is said to have an input table and an output table. Relationships between the input and output tables of operators within the tree define a direction of the operator tree. If Operator A's output table is one of Operator B's input tables, we say that Operator A is an upstream operator of Operator B. Conversely, Operator B is the downstream operator of Operator A.

The mapping from query command sequence to operator tree depends on the query language. With Pig Latin, there is a one-to-one correspondence between query statements and operators. The exemplary embodiments in this disclosure focus on this one-to-one case. In this case the example data is to consist of one example table per operator output, as in FIG. 1. Preferably the example tables are mutually consistent, meaning that the example output table of each operator is exactly the table produced by executing the operator over its example input tables.

Figure 2:
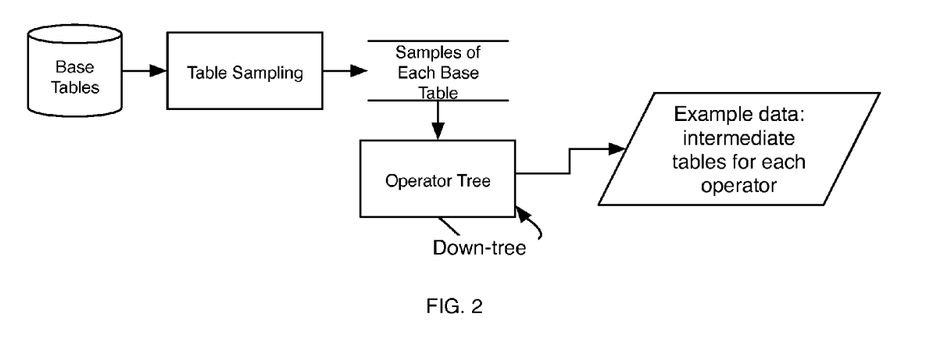
FIG. 2 is a flowchart that illustrates a method for using a sample table to illustrate query semantics.

FIG. 2 illustrates a naïve approach to generating example data given a large base table and an operator tree. First, each base table is sampled to produce a sample table. Then the sample data is pushed downstream through the operator tree and the intermediate input and output tables produced by each operator are recorded.

Unfortunately, this approach does not always achieve desired completeness. Lack of completeness can be overcome by using very large samples, or perhaps by biasing the sampling method so as to avoid incomplete example data for a particular user query. Unfortunately, at present these techniques would be too expensive to achieve desired efficiency and preferred real-time sample data generation as a user types and edits queries. Thus if such large-scale or biased database samples are used with current hardware they are preferably prepared offline and be of small size.

Figure 3:
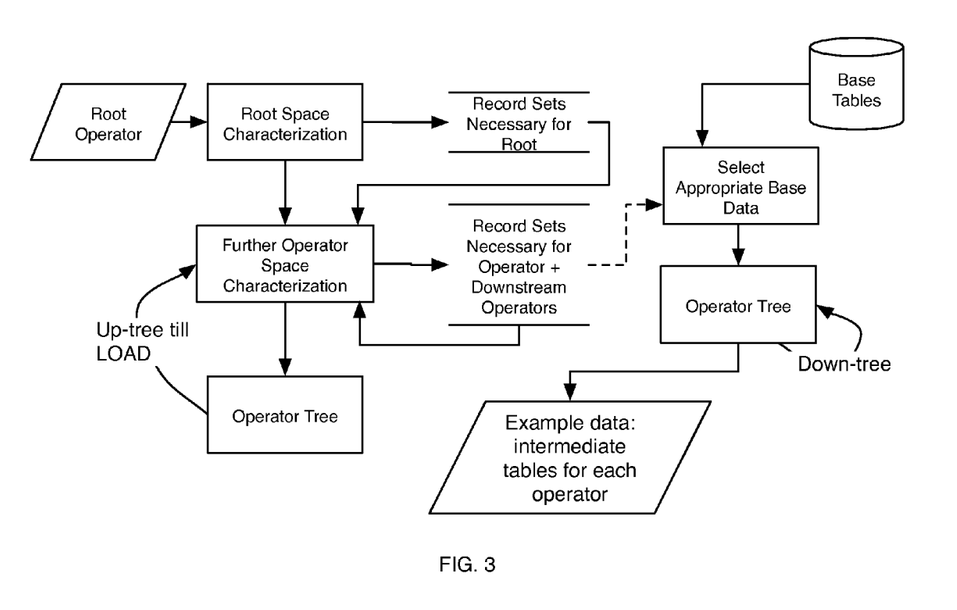
FIG. 3 is a flowchart that illustrates a method of constructing a sample table that attempts to fully illustrate query semantics.

FIG. 3 illustrates a possible approach to generating example data with fewer incompleteness problems than the downstream propagation approach of FIG. 2. The method illustrated in FIG. 3 takes an upstream approach. Starting with the root operator, each operator in the tree is used to characterize a space of record sets that would lead to completeness and conciseness for that operator. As illustrated, the Root Operator is input to a Root Space Characterization process that generates Record Sets Necessary for Root completeness and/or conciseness. These Sets are propagated upstream to the Further Operator Space Characterization process that modifies the Sets to generate Records Sets Necessary for itself and Downstream Operators. This data is further propagated upstream through the Operator Tree till the leaves, e.g. LOAD operator, are reached. Then the Records Sets Necessary for the leaves and downstream operators are passed to a process that Selects Appropriate Base Data from the Base Table. This selected data is then pushed downstream through the Operator Tree to construct the final example data, of intermediate tables for each operator.

As mentioned above, the notion of completeness is operator dependent and a concise data set will contain records that both pass an operator and those that do not. For example, a complete concise data set for a FILTER command that requires a first field to equal zero, an appropriate record set would contain exactly one record whose first field equals zero and exactly one record whose first field does not equal zero.

Upstream propagation methods, such as in FIG. 3, rely on invertiblity of operators, i.e. the ability to transform an output record set of an operator into input record set(s) that, when pushed through the operator, yield the output set.

Operator invertibility is impeded by the use of user-defined functions (UDFs), which are required by some operator instances. For example, a FILTER operator may invoke a Boolean-valued UDF to decide whether an input record is to be propagated to the output. Another operator, called TRANSFORM, applies a record-valued UDF to each input record, thereby transforming it into some other record as governed by the UDF. Because UDFs may contain arbitrary code, operators that invoke UDFs are typically noninvertible, which means that it is not always possible to construct an input record that will lead to a given output. The only way to generate example data for noninvertible operators is to push data through operators in the downstream direction with the UDF defined.

Preferred Approaches

Preferred approaches consistent with embodiments of the present invention include both upstream and downstream steps, and consistent with FIGS. 4-7. In the presence of noninvertible operators, completeness is attempted though a combination of up- and down-stream propagation. First, a sample database whose size is as large as can be handled in a reasonable amount of time is propagated down-stream. Definitions of reasonable time can vary, but one example is without causing the latency to generate example data to become excessive from the user's point of view. Then, upstream propagation is used to improve the completeness of any operator instances in the tree that are invertible. As a final step, some of the data is pruned to improve conciseness while retaining the same level of completeness we got from the downstream and upstream propagation steps.

Figure 4:
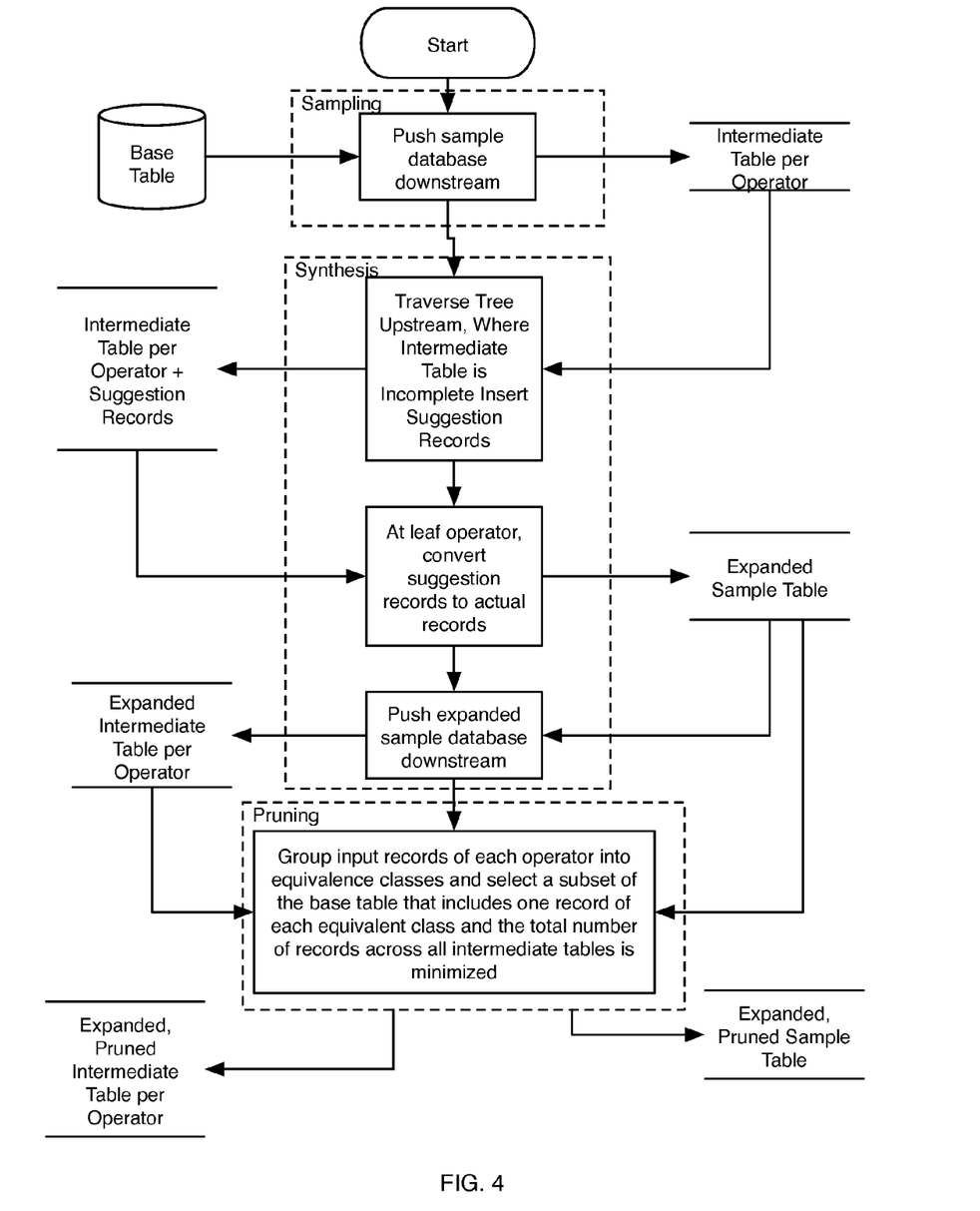
FIG. 4 is a flowchart that illustrates a method of constructing a sample table to illustrate query semantics consistent with some embodiments of the present invention.

Referring now to FIG. 4, three steps included in some embodiments of the present invention are sampling, synthesis, and pruning, which are labeled in the figure. In Sampling, an appropriately sized sample of Base Table is taken as an initial sample table and the initial sample table is passed though an operator tree of the query to form an Intermediate Table for each Operator from the operator tree. The Intermediate Table records the input and output tables for each operator.

Synthesis involves forming an Expanded Sample Table from the Base Table based on incompleteness in the Intermediate Table. In FIG. 4, the synthesis step involves Traversing the Operator Tree in an upstream direction, where the Intermediate Table is incomplete inserting Suggestion Records, and propagating the Suggestion Records upstream. Then, at the leaf operator, converting the Suggestion Records to synthetic records drawn from the Base Table and forming an Expanded Sample Table therefrom. Finally, the Expanded Sample Table is pushed downstream through the Operator Tree to form an Expanded Intermediate Table per Operator.

Pruning involves grouping classes of equivalent records in the expanded intermediate table and retaining a set of expanded sample table records whose corresponding set of intermediate records includes at least one record from all equivalent classes while being as small as possible. Thus, following pruning, the process produces and Expanded, Pruned Sample Table and an Expanded, Pruned, Intermediate Table per Operator.

In summary, the sampling supplies some initial data to work with, including as many input/output examples for noninvertible operators obtainable in an acceptable amount of time. Synthesis addresses any incompleteness, to the extent possible given the limitations of noninvertible operators, by adding more data. Pruning attempts to produce final example data that is as concise as is possible without reducing completeness.

Sampling

Figure 5:
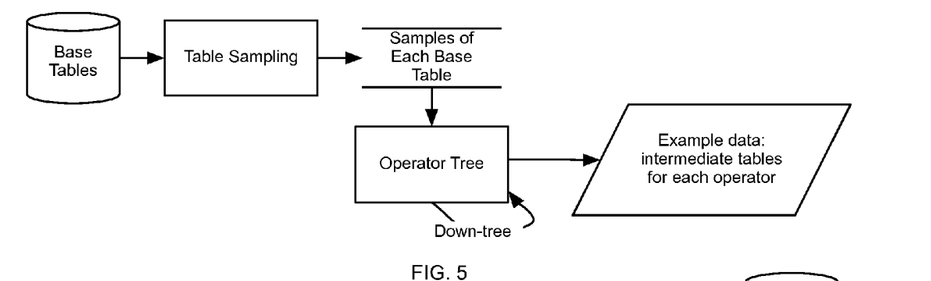
FIG. 5 is a flowchart that illustrates sampling and initial example data table formation consistent with some embodiments of the present invention.

FIG. 5 illustrates details of a sampling process consistent with an initial sampling step of the present invention. A Table Sampling step produces Samples of Each Base Table, which are pushed downstream through the Operator Tree of the query being processed to produce Example Data. Here the Example Data are Intermediate Tables for each Operator in the Operator Tree. The process in FIG. 5 is similar to the naïve process of example data formation discussed earlier with reference to FIG. 2. Here, however, performance requirements dictate the size of the initial sample, and the later steps of the sample data formation process fill in any gaps.

Synthesis

A key concept used in defining synthesis is that of a Suggestion Record, which is a set of possible records from which one will ultimately be chosen. The set of available choices for a Suggestion Record may be specified either explicitly or implicitly. An exemplary explicit specification is a list of record choices. An exemplary implicit specification is a set of constraints on the possible values the record fields may contain.

For example, in one possible system, Suggestion Records are a list of fields, each paired with one of (a) a concrete value for that field, or (b) a token denoting that any value is acceptable.

Figure 6:
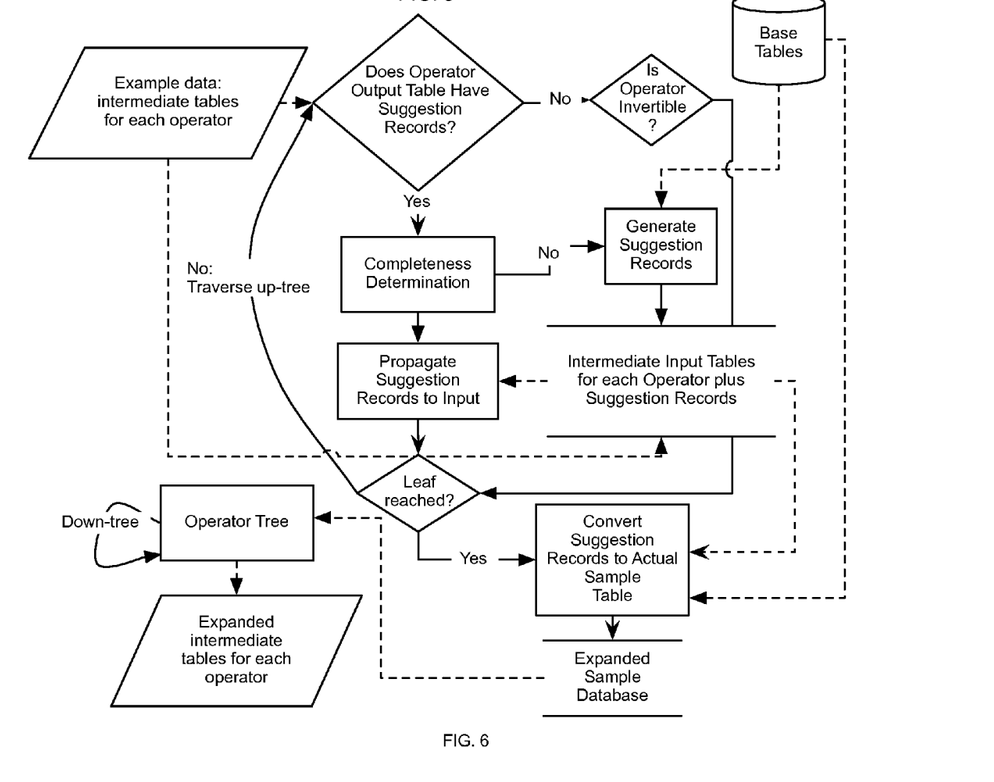
FIG. 6 is a flowchart that illustrates synthesis of an expanded sample table and expanded example data table consistent with some embodiments of the present invention.

Suggestion Records are inserted into intermediate tables during synthesis as a means to converge to a more complete example data set. FIG. 6 illustrates details of a synthesis process consistent with the present invention. In FIG. 6, the procedure is as follows: Starting at the Root, examine each operator's input and output tables from the Intermediate Tables for each Operator produced by sampling. For Root and further Operators conduct Completeness Determination. If the operator's semantics are not illustrated completely, and if possible (generally if the operator is invertible) introduce Suggestion Records into the input table(s) of the Intermediate Tables in order to improve the situation.

Additionally, when the operator's output table in the Intermediate Tables contains suggestion records if possible (generally if the operator is invertible) insert Suggestion Records into the operator's input table(s) in the Intermediate Tables that produce records matching the Output Table Suggestion Records. This step propagates any Suggestion Records inserted due to operators downstream from invertible operators upstream through the invertible operator.

When a leaf node, e.g. a LOAD operator, is reached, convert any Suggestion Records to actual records and use them to supplement the Sample Table, forming an Expanded Sample Table. Preferably this conversion attempts to conform to real data values as much as possible by sampling from the Base Table. For example, with the constraint language described above 'any value' tokens are replaced with the value of the corresponding field of a sampled base table record. Lastly, push the Expanded Sample Table through the operator tree to produce Expanded Intermediate Tables for each operator.

Implementation specifics depend on the particular operator involved. Specifically, the questions of how to, (1) propagate suggestion records from the output table to the input table(s) and (2) select new suggestion records for the input table(s) in order to achieve full illustration of the operator semantics. As stated earlier, the chosen definition of "full illustration of operator semantics" may differ.

A few examples of reasonable ways to handle some key operator types are described below.

Suggestion Records for UNION

Exemplary Requirement To illustrate the semantics of UNION, require at least one record in each input table Corresponding Procedure: For each Suggestion Record found in the output table, insert a copy of the record into each Input Table. Although this procedure produces redundant data at the end of the synthesis phase, the redundancy is likely to be eliminated in the subsequent pruning phase. In fact the reason to copy suggestion records to each Input Table, instead of selecting only one, is to allow the pruning phase to select the most desirable option. If there were not Suggestion Records in the Output Table, then insert into each Input Table a Suggestion Record with 'any value' tokens in every field.

Suggestion Records for FILTER

Exemplary Requirement: For FILTER, require at least one record that passes the filter and one that does not.

Corresponding Procedure: For each Suggestion Record in the Output Table, create a copy and check whether it passes the FILTER. If it does not pass, attempt to modify it so that it does pass, by converting some of its 'any value' fields into concrete data values. Then insert the (modified) Suggestion Record into the Input Table. If, after all Output Table Suggestion Records have been processed, the Input Table contains no records that pass the FILTER, attempt to form a Suggestion Record that does pass and insert it into the Input Table. Lastly, if no Input Table record fails to pass the FILTER, attempt to generate and insert a Suggestion Record that does fail to pass.

Suggestion Records for GROUP and COGROUP

Exemplary Requirement To illustrate GROUP or COGROUP (which is a generalization of GROUP in contemporary query languages), we require a GROUP Output Table that contains at least two records total, with at least one record from each Input Table.

Corresponding Procedure: For each GROUP in the Output Table (including Suggestion Records), insert Suggestion Records into the Input Tables as needed to ensure the GROUP output contains at least two records total and at least one record from each Input Table. Ensuring that every group has adequate membership leaves many options available to the subsequent pruning phase.

Pruning

Figure 7:
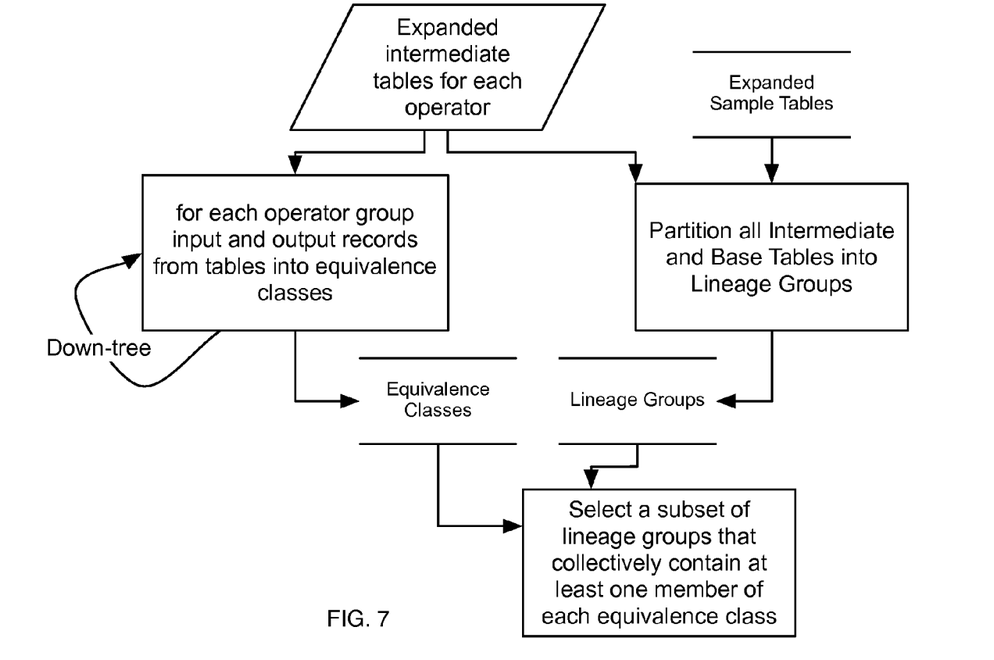
FIG. 7 is a flowchart that illustrates pruning of an expanded sample table and expanded example data table consistent with some embodiments of the present invention.

Pruning reduces the expanded sample table to form a final sample table by grouping classes of equivalent records in the expanded intermediate table and retaining a set of expanded sample table records whose corresponding set of intermediate records includes at least one record from all equivalent classes while being as small as possible An exemplary implementation, shown in FIG. 7, of pruning operates on the Expanded Intermediate Tables for each operator and on the Expanded Intermediate Sample Table. The process proceeds to classify input and output records for each operator's input and/or output records into Equivalence Classes, such that preserving any single member of an equivalence class is sufficient to maintain the same level of completeness. Then, the process Partitions all Intermediate and Base Tables into disjoint Lineage Groups, where a lineage group consists of records that derive from each other as they flow through the operator tree. Finally, given the Equivalence Classes and Lineage Groups, the process selects a subset of Lineage Groups such that collectively contain at least one member of each Equivalence Class.

Preferably, Equivalence Classes are formed differently for each type of operator. For example, in UNION, each input table forms an Equivalence Class, because one record per Input Table suffices for completeness. For FILTER, the set of Input Table records that pass the FILTER form one Equivalence Class, and the set of Input Table records that do not form another. For COGROUP, there is one Equivalence Class containing each Output Table group record that satisfies the completeness properties specified earlier.

Lineage Groups are preferably defined by the connected components of an undirected graph having records as vertices and an edge between each pair of interdependent records. If eliminating Record A affects the content or presence of some downstream Record B, then Records A and B are interdependent. For example, the set of Base Table records that get placed into a single GROUP record, along with the GROUP record itself, are in the same Lineage Group. The total number of base and intermediate records in a Lineage Group is called its cardinality.

A set of example records, a set of Equivalence Classes over these records, and a partitioning of records into Lineage Groups, pruning is accomplished by solving the following optimization problem: Select a subset of Lineage Groups that collectively contain at least one member of each Equivalence Class, such that the sum of Lineage Group cardinalities is minimized. Solving this optimization problem yields a set of example records of minimal size, and hence maximal conciseness, that is as complete as the example data produced by the synthesis. Some embodiments employ a weighted cardinality measure as a heuristic to bias toward selecting real data over synthetic data. In such embodiments each record receives a numerical weight, with synthetic records assigned a higher weight than real ones.

This optimization problem is isomorphic to the classical weighted set-covering problem, which is known to be NP-hard to approximate to a factor better than $O(\log n)$, where n is the number of equivalence classes. Thus, one way to solve the optimization problem is by applying a greedy set-covering algorithm that achieves the optimal approximation factor $O(\log n)$: Repeatedly select the Lineage Group with the highest value of the ratio c/w, where c is the number of Equivalence Classes covered by this Lineage Group that were not previously covered, and w is the (weighted) cardinality of this group. Stop when all Equivalence Classes have been covered.

Recursive Pruning

In the presence of large lineage groups, the pruning procedure described earlier in this section does not achieve maximal conciseness. This is because pruning reduces the number of lineage groups, but does not reduce the size of any groups.

One approach consistent with the present invention is to apply a pruning algorithm as set forth above recursively. An example method proceeds as described below on a query comprising a linear chain of n operators $O_1, O_2, \ldots, O_n$. After the initial pruning completes, a second pruning pass proceeds over lineage groups and equivalence classes defined over the query prefix $O_1, O_2, \ldots, O_{n-1}$. This process continues recursively till a final pruning pass over the single operator $O_1$. In the case of a query whose operators form a tree, e.g. due to binary operators such as join or union, the procedure works recursively down each branch of the tree in turn. Assume in this example that some intermediate operator $O_i$ is a group operator that produces large groups. The initial pruning pass eliminates most of $O_i$'s output groups, but retain at least one group output record $R_G$=(group id, $\{R_1, R_2, \ldots, R_m\}$). The records $R_1, R_2, \ldots, R_m$ had independent lineage prior to $O_i$, but due to $O_i$ were placed into a single lineage group along with $R_G$. With recursive pruning, a subsequent pruning pass will consider the operator prefix $O_1, O_2, \ldots, O_{i-1}$, for which $R_1, R_2, \ldots, R_m$ are in separate lineage groups. In this pass some of $R_1, \ldots, R_m$ will be eliminated, resulting in the group $R_G$ being reduced in size as desired.

The non-recursive pruning algorithm described earlier never reduces completeness because it ensures retention of at least one member of each equivalence class. However, some recursive pruning implementations do not preserve completeness. For example, as mentioned earlier, in pruning for a group operator only groups that contain two or more records are placed in the equivalence class $E_1$ of acceptable example records for that operator. In the example given above, if recursive pruning eliminates all but one record belonging to group $R_G$, then $R_G$ would cease to be a member of $O_i$'s equivalence class $E_1$. If $R_G$ had been the only group record retained in the original pruning pass, then $E_1$ would cease to be covered, degrading completeness.

One method to avoid excessive pruning considered in the present invention is to impose a stopping condition. One such stopping condition is as follows: After each recursive pruning pass, if completeness (measured on the full query) degrades, then revert to the outcome of the previous pass and cease pruning the current branch.

Some methods consistent with the present invention also modify the recursive pruning procedure to perform some pruning without triggering a stopping condition. An example is recursive pruning with pruning constraints. One such constraint specifies that among a certain set of records, at least c of them must remain after pruning. At each step, records that belong to a constrained set with only c remaining members are bypassed, i.e., they are not treated as candidates for pruning. The presence of a downstream group operator imposes a pruning constraint with c=2 on each set of records belonging to the same group, e.g., records $R_1, R_2, \ldots, R_m$ in the above example.

Although the present invention has been described in terms of specific exemplary embodiments, it will be appreciated that various modifications and alterations might be made by those skilled in the art without departing from the spirit and scope of the invention. The scope of the invention is not limited to the exemplary embodiments described and should be ascertained by inspecting the appended claims.

What is claimed is:

1. A computer-implemented method of forming a sample table from a base table for testing semantics of a query to be run on the base table, comprising:
    sampling the base table to form an initial sample table and forming an intermediate table of each operator from an operator tree of the query by passing the initial sample table through the operator tree;
    inserting suggestion records into the intermediate table based on incompleteness in the intermediate table to form an expanded sample table;
    passing the expanded sample table through the operator tree to form an expanded intermediate table;
    pruning the expanded sample table to form a final sample table, wherein said pruning comprises:
        grouping equivalence classes of equivalent records in the expanded intermediate table;
        retaining a set of expanded sample table records whose corresponding set of intermediate records includes at least one record from all equivalence classes while being as small as possible; and
        classifying expanded sample table records and expanded intermediate table records into lineage groups, wherein the lineage groups each correspond to a set of records that derive from each other as they flow through the operator tree.

2. The computer-implemented method of claim 1, wherein the step of synthesizing employs suggestion records inserted into the intermediate table to construct the expanded sample table.

3. The computer-implemented method of claim 2, wherein the suggestion records propagated up the operator tree to a leaf operator of the tree where they and the intermediate table are use to form the expanded sample table from the base table.

4. The computer-implemented method of claim 2, wherein the suggestion record is listing of a field paired with either a concrete value or a token denoting that any value is acceptable.

5. The computer-implemented method of claim 2, wherein the structure of the suggestion record varies depending on the operator involved.

6. The computer-implemented method of claim 1, wherein the equivalence classes are formed differently for different operators.

7. A computer-implemented method of forming a sample table from a base table for testing semantics of a query to be run on the base table, comprising:
    sampling the base table to form an initial sample table and forming an intermediate table of each operator from an operator tree of the query by passing the initial sample table through the operator tree; and
    pruning the initial sample table to form a final sample table, wherein said pruning comprises:
        grouping equivalence classes of equivalent records in the intermediate table;
        retaining a set of sample table records whose corresponding set of intermediate records includes at least one record from all equivalence classes while being as small as possible; and
        classifying sample table records and intermediate table records into lineage groups, wherein the lineage groups each correspond to a set of records that derive from each other as they flow through the operator tree.

8. The computer-implemented method of claim 7, wherein the equivalence classes are formed differently for different operators.

9. A computer-implemented module for interfacing with a database server and a database client to form a sample database from a base table, comprising:
    an input element configured to receive a query comprising a set of operators that form an operator tree;
    a database sampling element configured to sample the base table to form an initial sample table;
    a processing element configured to form an intermediate table by passing the initial sample table through the operator tree, to synthesize an expanded sample table from the base table based on incompleteness in the intermediate table of each operator, and to prune the expanded sample table to form a final sample table, wherein the pruning proceeds by grouping equivalence classes of equivalent records in an expanded intermediate table, formed by passing the expanded sample table through the operator tree, retaining a set of expanded sample table records whose corresponding set of intermediate records includes at least one record from all equivalent classes while being as small as possible, and classifying expanded sample table records and expanded intermediate table records into lineage groups, wherein the lineage groups each correspond to a set of records that derive from each other as they flow through the operator tree.

10. The computer-implemented module of claim 9, wherein synthesizing employs suggestion records inserted into the intermediate table to construct the expanded sample table.

11. The computer-implemented module of claim 10, wherein the suggestion records propagated up the operator tree to a leaf operator of the tree where they and the intermediate table are use to form the expanded sample table from the base table.

12. The computer-implemented module of claim 10, wherein the suggestion record is listing of a field paired with either a concrete value or a token denoting that any value is acceptable.

13. The computer-implemented module of claim 10, wherein the structure of the suggestion record varies depending on the operator involved.

14. The computer-implemented module of claim 9, wherein the equivalence classes are formed differently for different operators.

* * * * *